US008682889B2

(12) United States Patent
Zheng

(10) Patent No.: US 8,682,889 B2
(45) Date of Patent: Mar. 25, 2014

(54) SEARCH AND REPLAY OF EXPERIENCES BASED ON GEOGRAPHIC LOCATIONS

(75) Inventor: Yu Zheng, Beijing (CN)

(73) Assignee: Microsoft Corporation, Redmond, WA (US)

(*) Notice: Subject to any disclaimer, the term of this patent is extended or adjusted under 35 U.S.C. 154(b) by 427 days.

(21) Appl. No.: 12/473,335

(22) Filed: May 28, 2009

(65) Prior Publication Data
US 2010/0306233 A1 Dec. 2, 2010

(51) Int. Cl.
*G06F 17/30* (2006.01)
(52) U.S. Cl.
USPC .......................................... 707/725; 706/12
(58) Field of Classification Search
USPC ................... 707/724, 725; 706/12
See application file for complete search history.

(56) References Cited

U.S. PATENT DOCUMENTS

| | | | |
|---|---|---|---|
| 2004/0165784 A1* | 8/2004 | Xie et al. ..................... | 382/254 |
| 2006/0079201 A1 | 4/2006 | Chung et al. | |
| 2006/0241860 A1 | 10/2006 | Kimchi et al. | |
| 2006/0258368 A1 | 11/2006 | Granito et al. | |
| 2008/0177853 A1 | 7/2008 | Chen et al. | |
| 2008/0268876 A1 | 10/2008 | Gelfand et al. | |
| 2009/0171902 A1* | 7/2009 | MacLaurin et al. ............... | 707/3 |

OTHER PUBLICATIONS

Aris et al., "Exploiting Location and Time for Photo Search and Storytelling in MyLifeBits", 2004.*
Gemmell et al., "MyLifeBits: Personal Database for Everything", 2006, ACM.*
Hori et al., "Context-based Video Retrieval System for the Life-Log Applications", 2003, ACM.*
Dodge et al.,"The ethics of forgetting in an age of pervasive computing", 2005, CASA.*
Gemmell et al., "The MyLifeBits Lifetime Store", 2003, ACM.*
"Pallotta, et al","RoamBlog: Outdoor and Indoor Geo-blogging Enhanced with Contextual Service Provisioning for Mobile Internet Users", retrieved at <<http://www.guinard.org/~unifr//docs/RoamBlog-final.pdf>>, pp. 1-12.
"Freeman, et al","Lifestreams: Organizing your Electronic Life", retrieved at <<https://www.aaai.org/Papers/Symposia/Fall/1995/FS-95-03/FS95-03-007.pdf>>, pp. 1-7.
"Chatterjee, Sharmistha","Instant Messaging and Presence with SIP", retrieved at <<http://users.tkk.fi/~jkangash/asi2008/chatterjee_draft.pdf>>, Nov. 12, 2008. pp. 1-8.
"Truong, Khai N.","INCA: An Infrastructure for Capture & Access", retrieved at <<http://66.102.1.104/scholar?hl=en&lr=&client=firefox-a&q=cache:q4y1hqf-bLUJ:etd.gatech.edu/theses/available/etd-07112005-153827/+emeeting+%2B+GPS+%2B+record>>, Aug. 2005. pp. 1-161.
"Botterweck, et al","Mobile RFID Management—An Application Scenario on the Handling of Industrial Liquid Containers", retrieved at <<http://domino.fov.uni-mb.si/proceedings.nsf/Proceedings/3045CCC4A6AFF827C12572EE007547FE/$File/Paper34.pdf>>, Jun. 4-6, 2007. pp. 1-12.

* cited by examiner

*Primary Examiner* — James Trujillo
*Assistant Examiner* — Dawaune Conyers
(74) *Attorney, Agent, or Firm* — Sonia Cooper; Brian Haslam; Micky Minhas

(57) ABSTRACT

Users are enabled to record and retrieve their experiences temporally and based on geographic locations. Experiences such as meetings, conferences, emails, other forms of communications are indexed along a timeline and associated with geographic locations. A user interface provides replay of experiences with links to associated documents, recordings, etc. employing a user friendly map feature.

18 Claims, 8 Drawing Sheets

SEARCH AND REPLAY OF EXPERIENCES BASED ON GEOGRAPHIC LOCATIONS

BACKGROUND

Modem telecommunication technologies such as multimodal communications, presence based services, and the like provide a number of useful tools for users to plan, facilitate, and manage their day-to-day activities such as meetings, attended conferences/seminars, email exchanges, voice and/or video communications, and similar activities. While planning and managing such activities has become easier, the number of activities undertaken by a typical person has also increased significantly. For example, people participate in more online meetings, hold video conferences, exchange messages, and so on throughout their day. While conventional tools like calendars and notebook applications may maintain a record of these activities, typically different activities are recorded by different applications making it difficult for a person to maintain an overall record of activities.

For some professions such as sales people, real estate agents, and similar ones, daily activities include meetings and conversations at various locations. Unless these people take valuable time each day to prepare records for their daily activities, it is difficult for them to maintain a comprehensive record of these activities. Even if they do it manually, to access associated documents and other records, they have to work with different resources through a cumbersome process.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to enabling users to retrieve and replay their experiences such as meetings, conferences, email exchanges, other forms of communication. A user interface provides visual feedback on a user's locations within a desired time frame. For each location, experiences may be displayed with actionable items such as links to documents, meeting or call recordings, and similar information.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
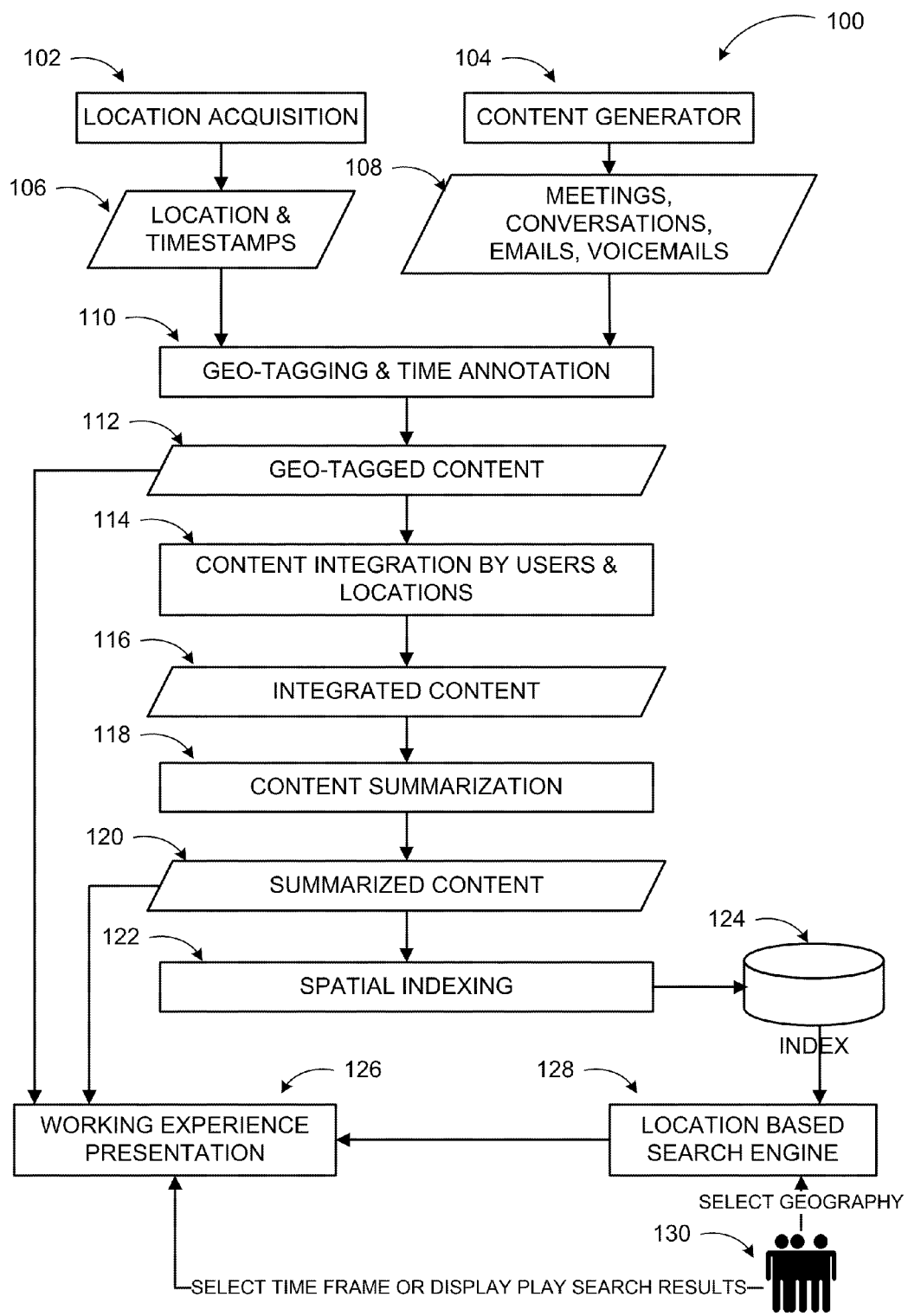
FIG. 1 is a diagram illustrating the architecture of an example geographic location based search and replay of experiences system according to embodiments.

As briefly described above, a user's experiences may be searched and replayed based on locations and timeline in a comprehensive manner. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media. The computer program product may also be a propagated signal on a carrier (e.g. a frequency or phase modulated signal) or medium readable by a computing system and encoding a computer program of instructions for executing a computer process.

Throughout this specification, the term "platform" may be a combination of software and hardware components for managing presence and location based entity presentation. Examples of platforms include, but are not limited to, a hosted service executed over a plurality of servers, an application executed on a single server, and comparable systems. The term "server" refers to a computing device executing one or more software programs typically in a networked environment. More detail on these technologies and example operations is provided below.

FIG. 1 is a diagram illustrating the architecture of an example geographic location based search and replay of experiences system according to embodiments. The architecture of an example geographic location based experience search and replay system has at the top level with the acquisition of a user's geospatial position and associated timestamp (102) using location-aware technologies such as Global Positioning Service (GPS), cellular network location determination, non-cellular network connection, and similar ones. As a second branch of the architecture, content for the experiences such as emails, conversation records, meeting notes, and other information is received (108) from content generator 104. Content generator 104 may be any application or database that can provide content information. The content may also include additional information such as links to associated documents and other information (e.g. contact information for participants of a conversation).

The location and timestamp information 106 and content information 108 are used for tagging all experiences such as every scheduled meeting, conversation history, phone calls, and the like, with a corresponding geospatial position and timestamp (110). The geo-tagged content 112 is processed for integration of the content for each user (the information may be processed at an organization level for all members) and locations (114). The integrated content 116 is summarized (118) for user-friendly presentation and easy indexing.

Summarized content 120 is used for building a spatio-temporal index over the tagged information (122). This enables spatio-temporal-search-based information retrieval. Based on a request from users 130, location based search engine 128 may retrieve the indexed information from index database 124 and perform the spatio-temporal search. Results of the search may be provided according to a visual scheme as working experience presentation 126. For example, a user can find out a meeting they attended a week ago in a specific building along with additional information.

While the example system architecture in FIG. 1 has been described with specific components, embodiments are not limited to these components or system configurations and can be implemented with other system configuration employing fewer or additional components. Furthermore, any of those components may be embodied as distinct applications, hosted services, or similar programs executed on one or more computing devices such as servers of an enhanced communication system or a client computing device.

Figure 2:
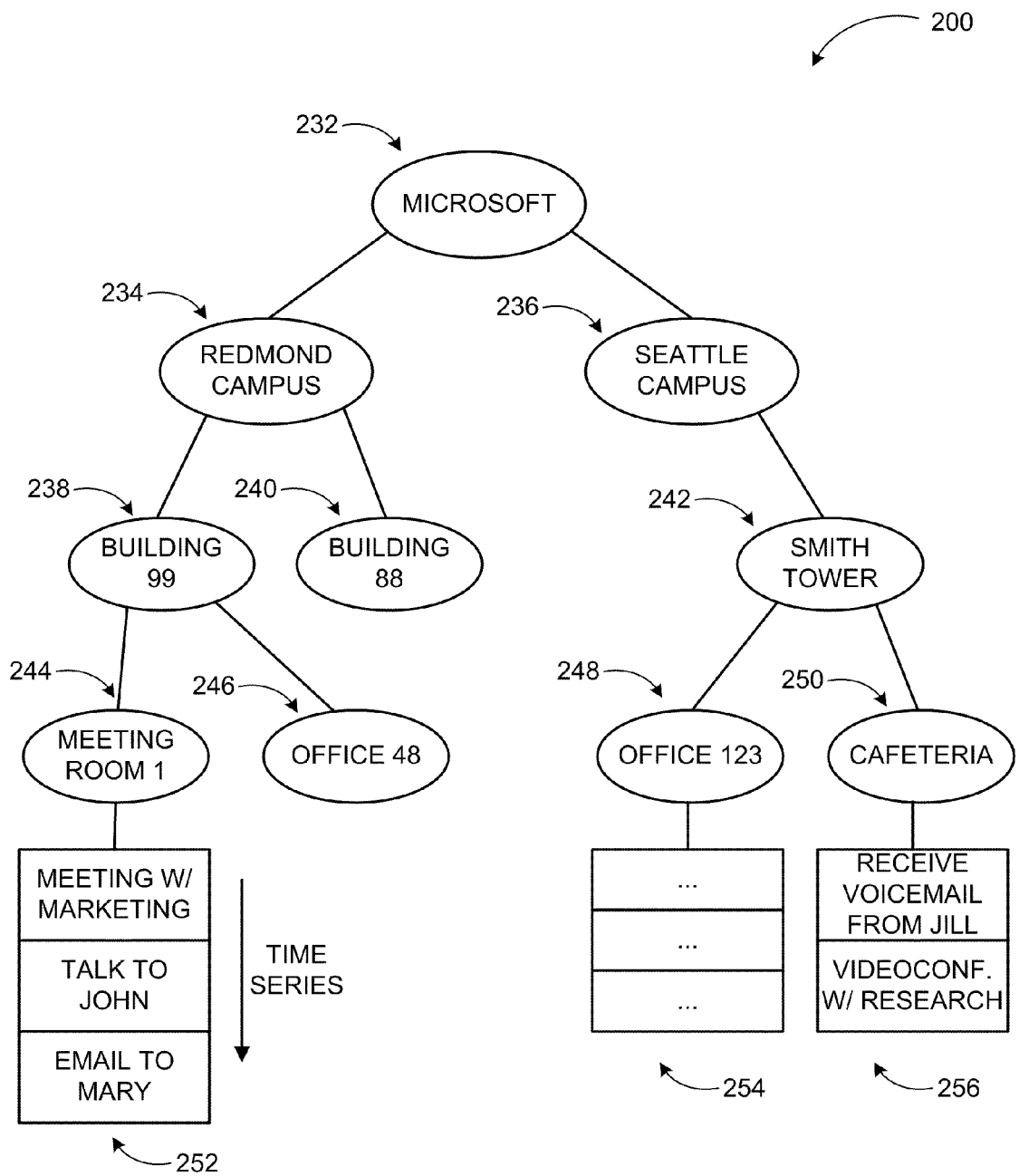
FIG. 2 is a diagram of an example spatial indexing structure that may be used in a geographic location based search and replay of experiences system according to embodiments.

FIG. 2 is a diagram of an example spatial indexing structure that may be used in a geographic location based search and replay of experiences system according to embodiments. The indexing structure 200 may have an organization 232 at the top level such as a company. This may be broken down into physical locations such as different campus locations 234 and 236. Each campus location may be subdivided into buildings (e.g. 238, 240, and 242) followed by a further division into offices and other building rooms such as meeting room 1 (244), office 48 (246), office 123 (248), and cafeteria (250). Of course any other grouping and division of locations may also be employed in spatial indexing.

Each member of the lowest level of locations (spatial index) may be coupled with experiences that occurred at each location following a time line (temporal index) as illustrated by example experiences 252, 254, 256, etc. While the indexing structure 300 is shown in a tree structure format, other formats may also be used to index experiences spatially and temporally.

Figure 3:
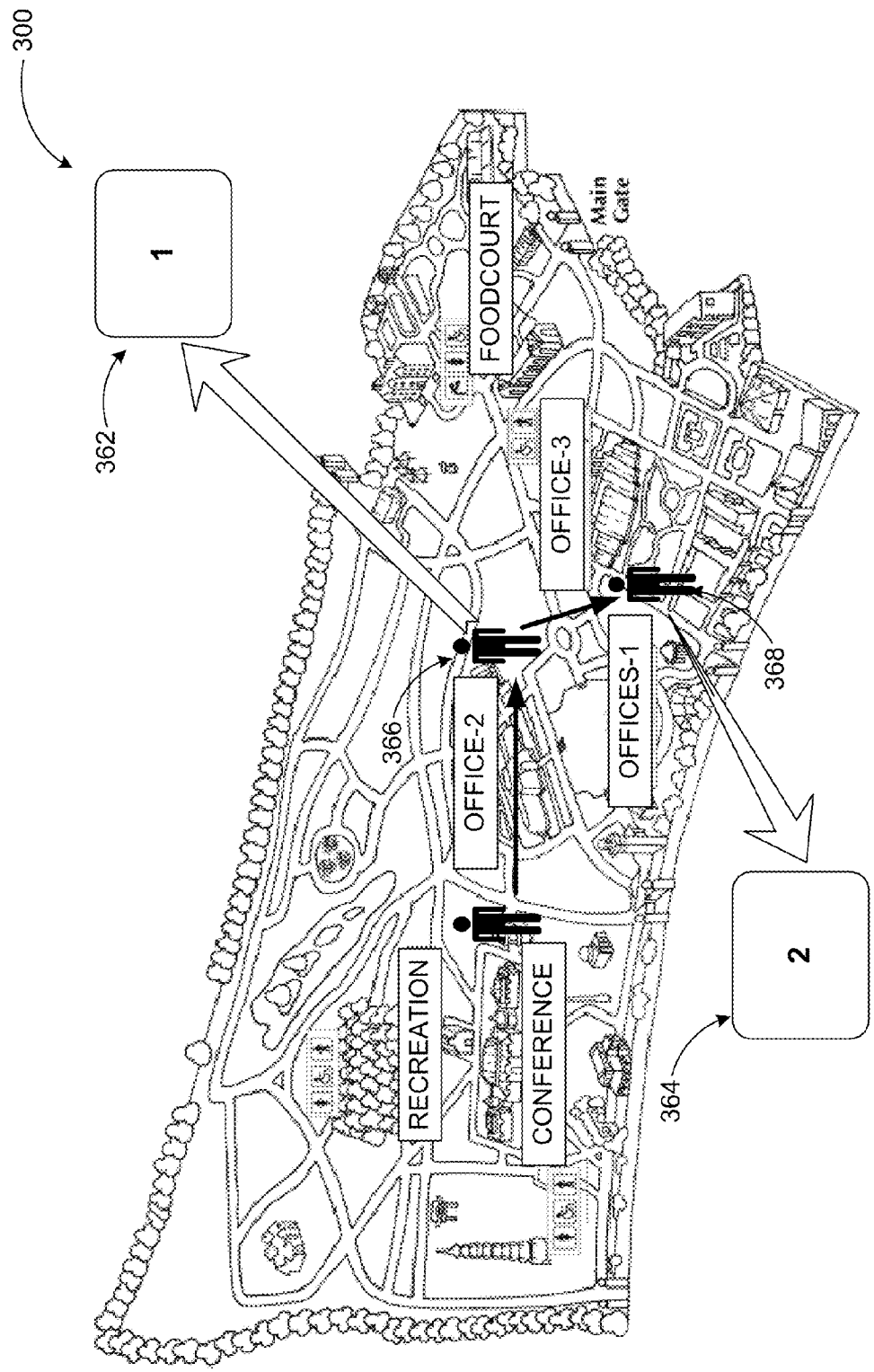
FIG. 3 is an example map showing a user's different locations during a day with links to experiences at each location that may be displayed by a user interface of a geographic location based search and replay of experiences application according to embodiments.

FIG. 3 is an example map showing a user's different locations during a day with links to experiences at each location that may be displayed by a user interface of a geographic location based search and replay of experiences application according to embodiments. While a map-based display of an overview of a user's activities may be a user friendly method of providing a top level replay for the experiences, a system according to embodiments may use any visual scheme to provide the overview including, but not limited to, a formatted list, an icon based scheme, and others.

The example map 300 illustrates the general location of where the user spent his/her day. Individual experiences may be grouped based on specific locations illustrated on the map 300 with an icon representing the user (e.g. 366, 368). Each icon may be linked to a sub-display of detailed view of the user's activities as shown in more detail below. The detailed activities views may be provided as separate user interfaces (e.g. separate display panes) or within the same user interface. According to one embodiment, iconic displays 362 and 364 may be provided within the same user interface and a new display pane opened upon user selection of those iconic displays. Map 300 may also include standard features of a map such as place identifiers, information on map features, and similar information.

Figure 4:
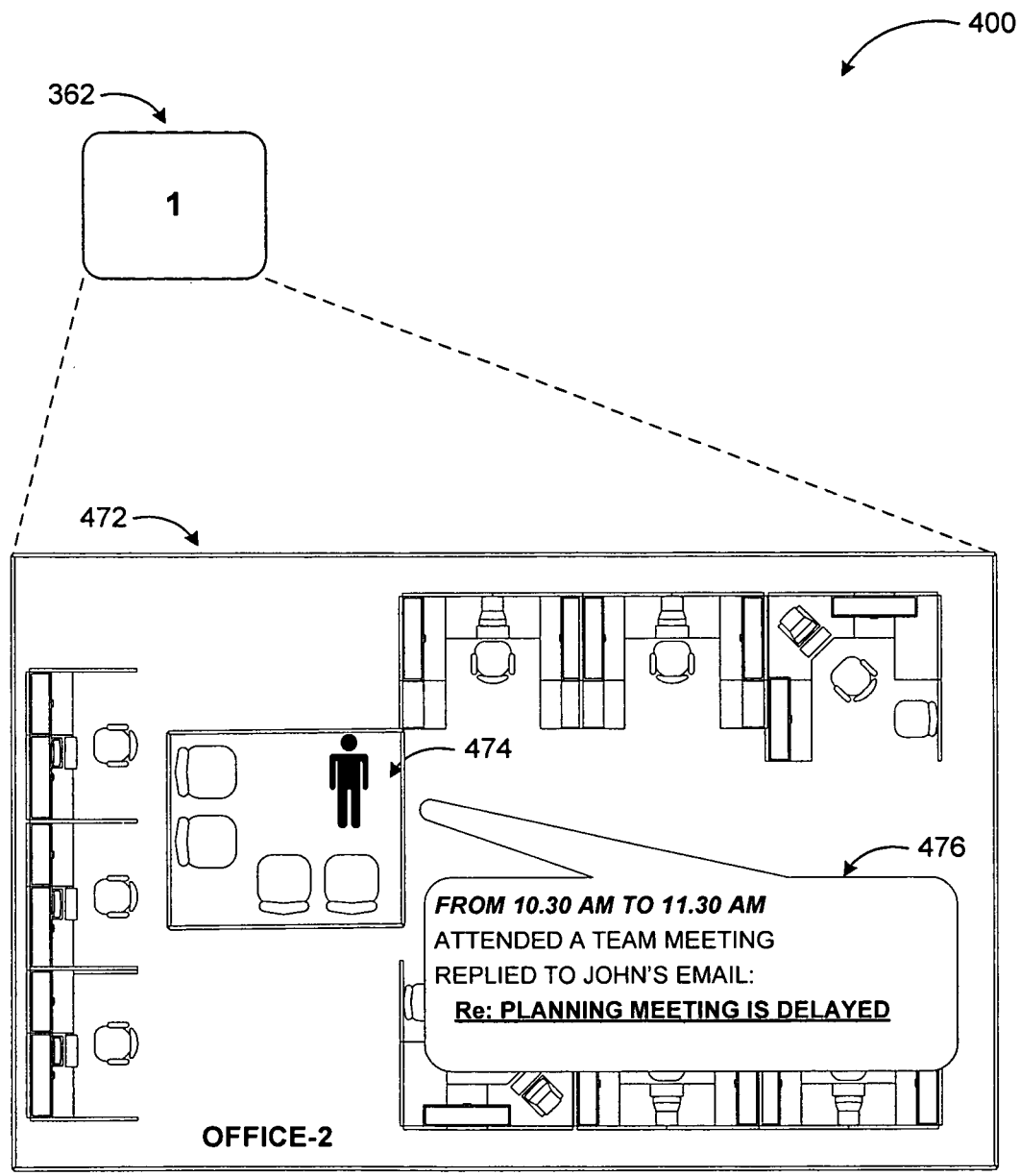
FIG. 4 illustrates a user interface feature of a geographic location based search and replay of experiences application displaying experiences for a selected location on the map of FIG. 3.

FIG. 4 illustrates a user interface feature of a geographic location based search and replay of experiences application displaying experiences for a selected location on the map of FIG. 3. User interface feature 472 in diagram 400 may be a new display pane activated when the user selected iconic display 362 of FIG. 3 corresponding to a location on the example map 300 (Office-2).

According to one example embodiment, user interface feature 472 may display the selected location (Office-2) as a building plan showing where the recorded experience took place with icon 474 representing the user. This enables the user to remember which part of the building (e.g. a meeting room) the experience(s) occurred. A callout balloon 476 may provide details of the experiences such as time frame (10.30 am to 11.30 am), what the experiences were (e.g. a team meeting and an email exchange).

Some of the information displayed may be actionable such as a subject of the exchanged email with a link to the message itself, a link to the meeting room to show a schedule of the meeting room, and the like. According to other embodiments, links (such as contact information) to participants of the meeting may also be provided. The information may be retrieved from a number of other applications such as the user's email application, a scheduling application for the meeting room, a presence application for the other participants, and similar ones.

Embodiments are not limited to email based information. A variety of communication applications facilitating communication modes such as voice communication, video communication, instant messaging, electronic mail, data sharing, application sharing, whiteboard sharing, and similar modes, may be used as a resource for retrieving experience information and associated records, documents, and so on.

Figure 5:
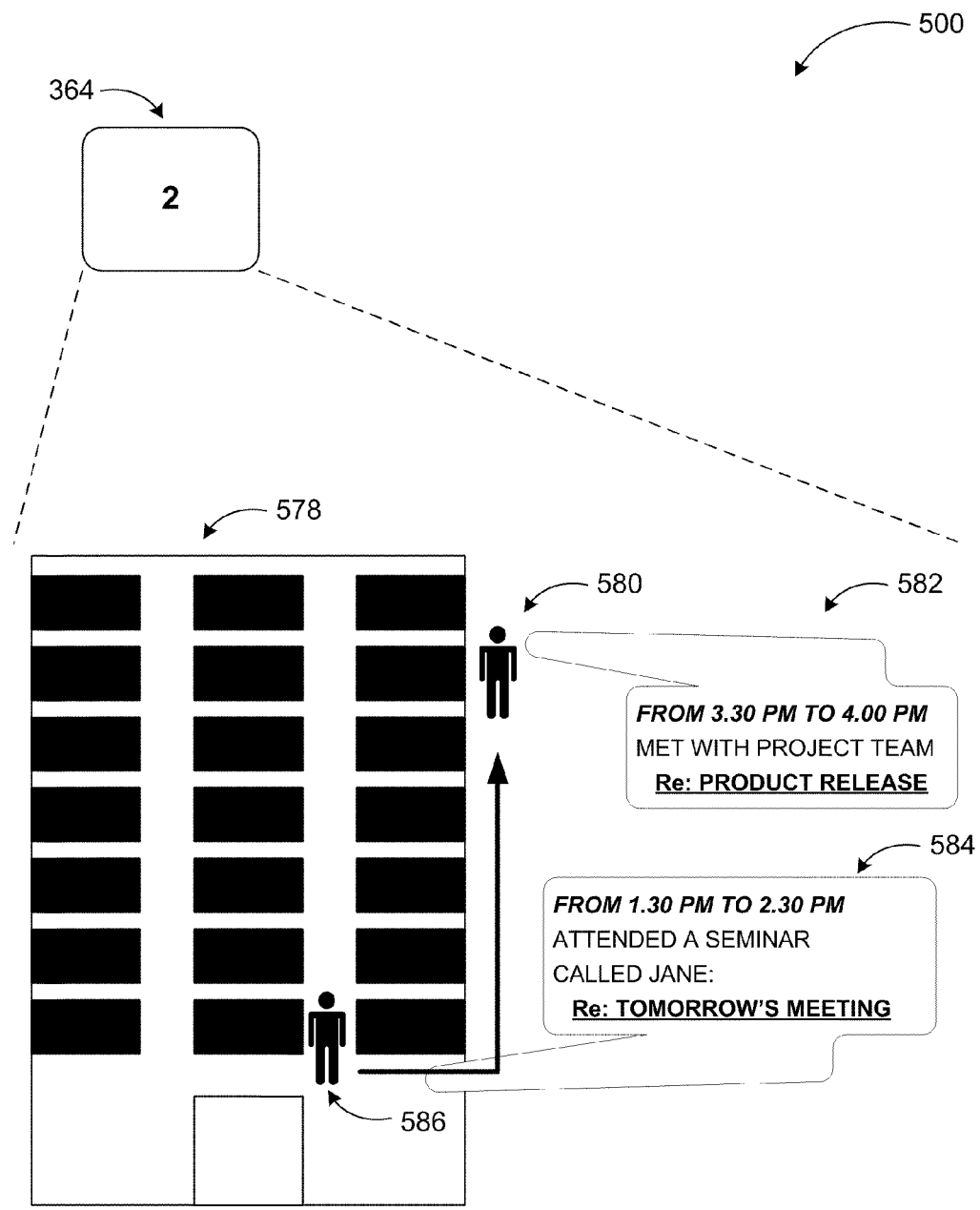
FIG. 5 illustrates another user interface feature of a geographic location based search and replay of experiences application displaying experiences for another selected location on the map of FIG. 3.

FIG. 5 illustrates another user interface feature of a geographic location based search and replay of experiences application displaying experiences for another selected location on the map of FIG. 3. User interface feature 576 in diagram 500 may be a new display pane activated when the user selected iconic display 364 of FIG. 3 corresponding to another location on the example map 300 (Office-1).

User interface feature 576 is another example display of experiences using a building model. The user may have had different experience in different locations of the building (Office-1). These locations are displayed by icons 580 and 586 representing the user at the different locations according to the timeline. Callout balloon 582 displays a meeting with the project team that took place between 3.30 pm and 4.00 pm on the subject of product release. The subject of the meeting may be presented as an actionable item that may provide a link to meeting notes and other associated project documents.

Callout balloon 584 displays two separate experiences: a seminar that was attended and a call placed to a colleague. The call's subject presented as actionable item may provide links to a recording of the call or contact information of the called party. As discussed previously, the information for the experiences may be retrieved from a plurality of resources along with timeline information. Geographic location information may be retrieved from a GPS server or similar location determining service and included in the indexing process along with the experiences and the timeline information.

According to some embodiments, a geographic location based experience search and replay application may be implemented by employing a branch-and-bound algorithm, a progressive improvement algorithm, and a heuristic algorithm. A user interface for such an application may display some of the information as actionable items (e.g. links) employing a graphical shape-based scheme, an icon scheme, a color scheme, or a text-formatting scheme. The example user interface features in FIGS. 4 and 5 may be configured to provide other functionality such as printing information associated with an experience by providing a link to relevant application(s).

While specific computing devices and experience related tasks have been described above, these are for illustration purposes only and do not constitute a limitation on embodiments. Many other hardware environments and communication related tasks may be implemented using the principles described herein.

Figure 6:
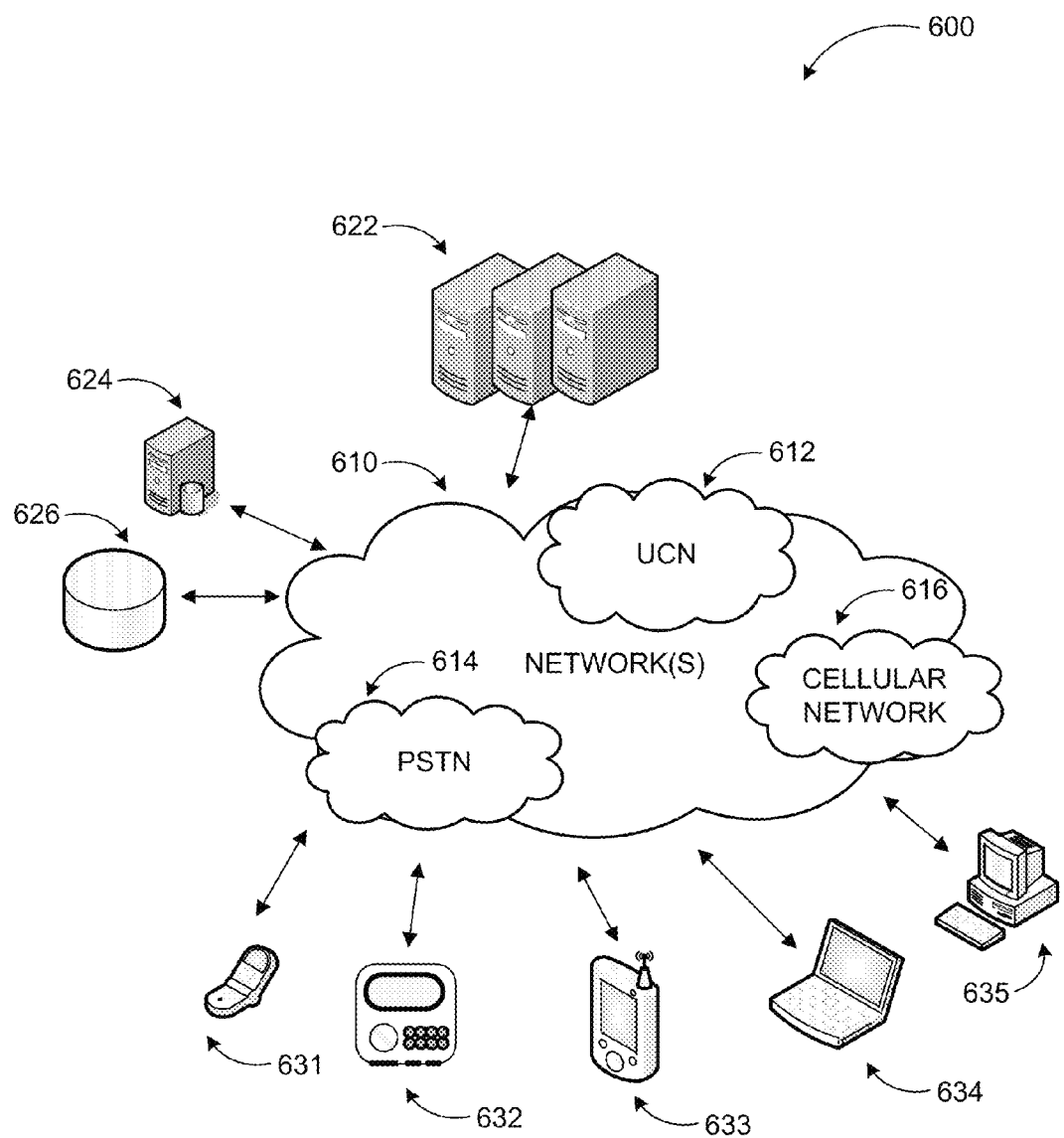
FIG. 6 is a networked environment, where a system according to embodiments may be implemented.

FIG. 6 is an example networked environment, where embodiments may be implemented. A platform providing experience replay services with above discussed features may be implemented via software executed over one or more servers 668 such as a hosted service. The platform may communicate with consuming applications on individual computing devices such as a cellular phone 631, smart automobile console 632, a handheld computer 633, a laptop computer 634, and desktop computer 635 ('client devices') through network(s) 610.

As discussed previously, client devices 631-635 are used to facilitate communications through a variety of modes between subscribers of the enhanced communication service. An experience replay application executed in one of the client devices or by one of the servers 622 may retrieve a subscriber's experiences from a number of sources and index them spatially and temporally such that the experiences can be searched by geographic location or timeline and replayed. Information associated with subscribers and their experiences may be stored in one or more data stores (e.g. data store 626), which may be managed by any one of the servers 622 or by database server 624.

Network(s) 610 may comprise any topology of servers, clients, Internet service providers, and communication media. A system according to embodiments may have a static or dynamic topology. Network(s) 610 may include a secure network such as an enterprise network, an unsecure network such as a wireless open network, or the Internet. Network(s) 610 may also comprise a plurality of distinct networks such as UC network 612, PSTN 614, and cellular network 616. Network(s) 610 provides communication between the nodes described herein. By way of example, and not limitation, network(s) 610 may include wireless media such as acoustic, RF, infrared and other wireless media.

Many other configurations of computing devices, applications, data sources, and data distribution systems may be employed to implement a system for retrieving, indexing, and replaying user experiences based on geographic location and timeline. Furthermore, the networked environments discussed in FIG. 6 are for illustration purposes only. Embodiments are not limited to the example applications, modules, or processes.

Figure 7:
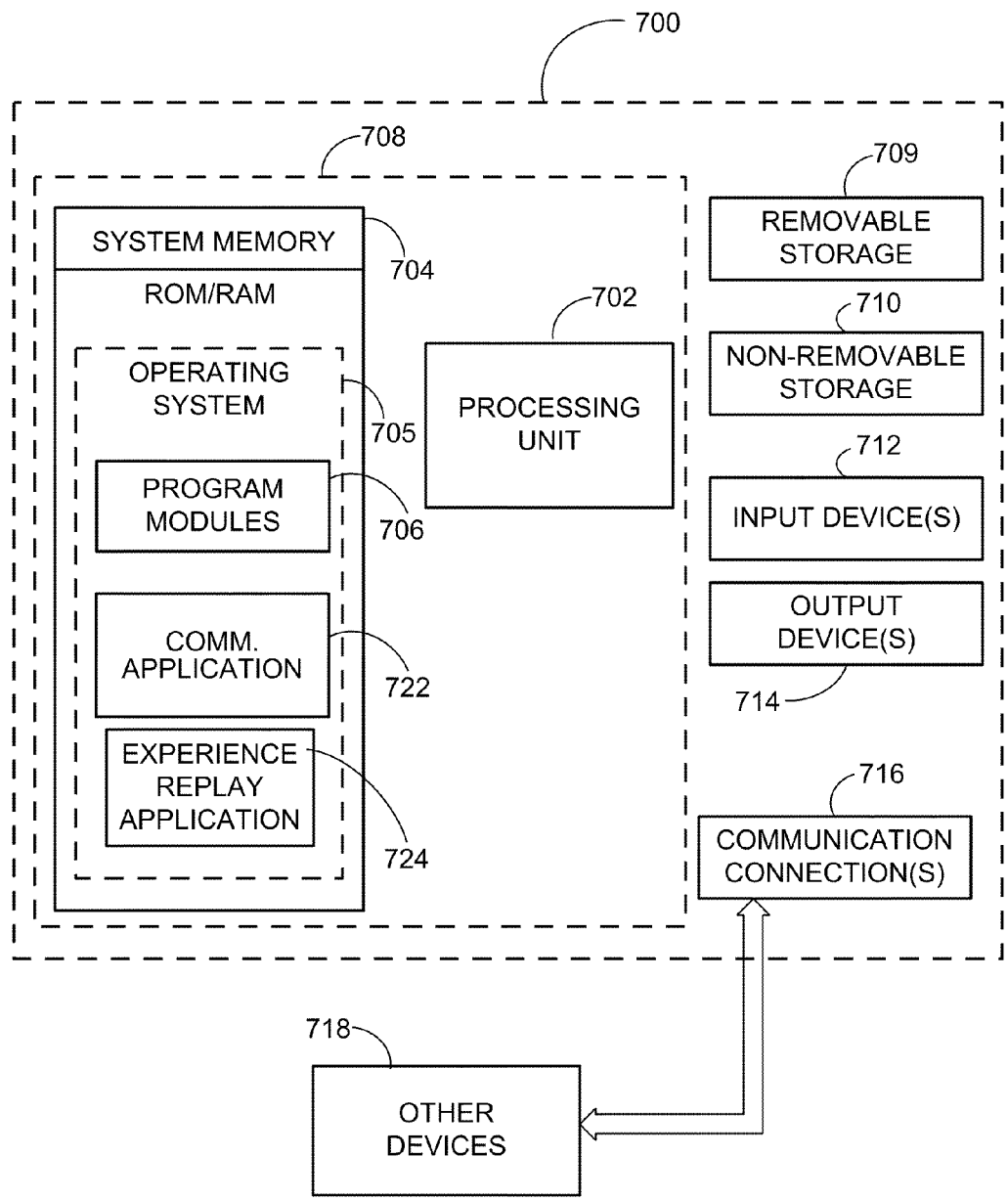
FIG. 7 is a block diagram of an example computing operating environment, where a communication application according to embodiments may be implemented.

FIG. 7 and the associated discussion are intended to provide a brief, general description of a suitable computing environment in which embodiments may be implemented. With reference to FIG. 7, a block diagram of an example computing operating environment for an application according to embodiments is illustrated, such as computer 700. In a basic configuration, computer 700 may include at least one processing unit 702 and system memory 704. Computer 700 may also include a plurality of processing units that cooperate in executing programs. Depending on the exact configuration and type of computing device, the system memory 704 may be volatile (such as RAM), non-volatile (such as ROM, flash memory, etc.) or some combination of the two. System memory 704 typically includes an operating system 705 suitable for controlling the operation of the platform, such as the WINDOWS ( operating systems from MICROSOFT CORPORATION of Redmond, Wash. The system memory 704 may also include one or more software applications such as program modules 706, communication application 722, and experience replay application 724.

Communication application 722 and experience replay 724 may be separate applications or integral modules of a hosted service that provides communication services to client applications/devices. Communication application 722 may facilitate communication between various subscribers in any modality and maintain records of communications. Communication application 722 and experience replay application 724 may be separate applications or integral modules of a hosted service that provides communication services to client applications/devices.

Computer 700 may have additional features or functionality. For example, the computer 700 may also include additional data storage devices (removable and/or non-removable) such as, for example, magnetic disks, optical disks, or tape. Such additional storage is illustrated in FIG. 7 by removable storage 709 and non-removable storage 710. Computer readable storage media may include volatile and nonvolatile, removable and non-removable media implemented in any method or technology for storage of information, such as computer readable instructions, data structures, program modules, or other data. System memory 704, removable storage 709 and non-removable storage 710 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computer 700. Any such computer readable storage media may be part of computer 700. Computer 700 may also have input device(s) 712 such as keyboard, mouse, pen, voice input device, touch input device, and comparable input devices. Output device(s) 714 such as a display, speakers, printer, and other types of output devices may also be included. These devices are well known in the art and need not be discussed at length here.

Computer 700 may also contain communication connections 716 that allow the device to communicate with other devices 718, such as over a wireless network in a distributed computing environment, a satellite link, a cellular link, and comparable mechanisms. Other devices 718 may include computer device(s) that execute communication applications, GPS satellites providing GPS data, cellular towers providing external data and/or positioning data, and comparable devices. Communication connection(s) 716 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 8:
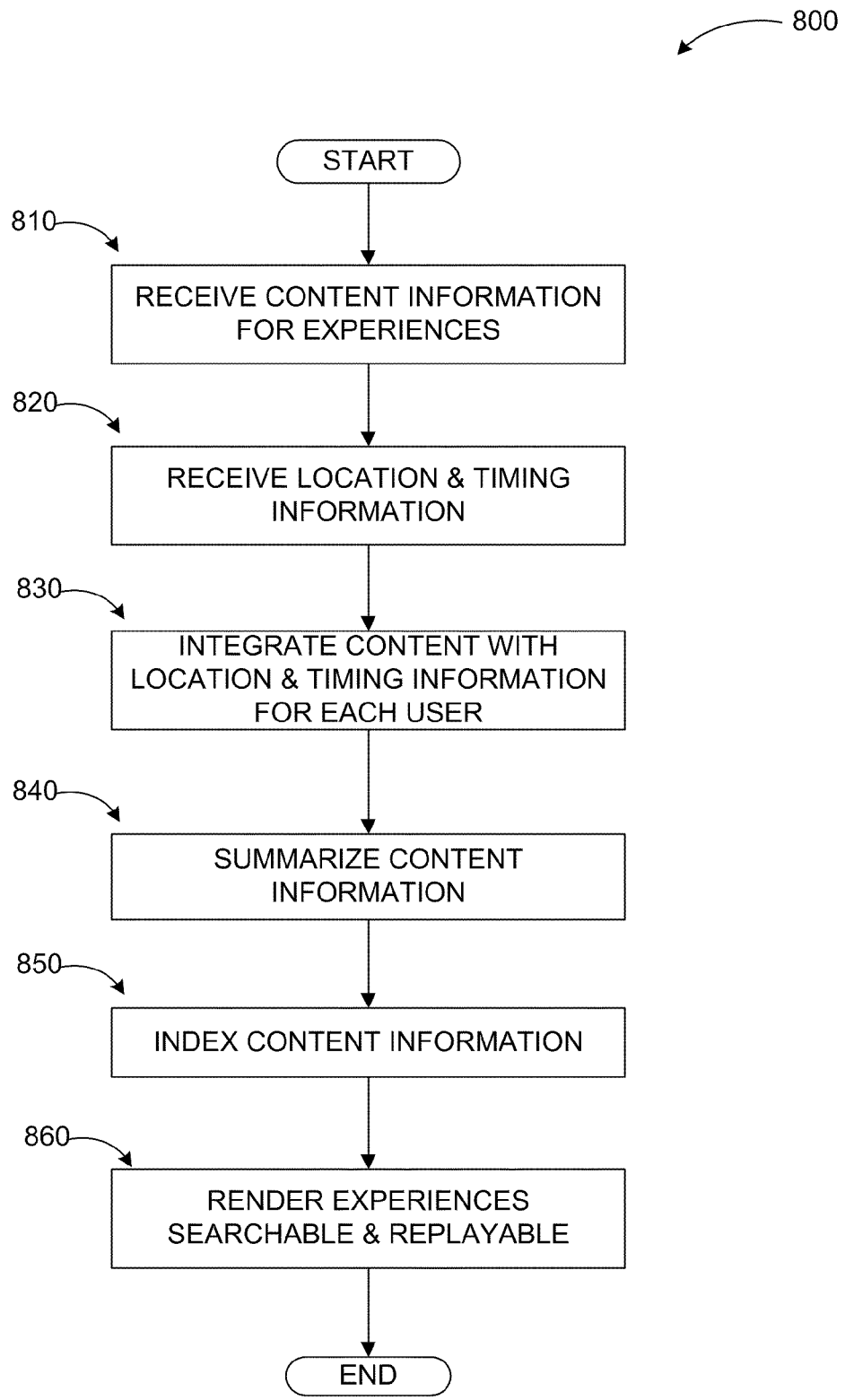
FIG. 8 illustrates a logic flow diagram for a process of providing geographic location based search and replay of experiences.

FIG. 8 illustrates a logic flow diagram for process 800 of providing geographic location based search and replay of experiences. Process 800 may be implemented as part of an enhanced communication system communication application such as the one described above.

Process 800 begins with operation 810, where content information for the experiences is received from a variety of sources as discussed above. The information may include additional links or location information associated with documents, recordings, etc. related to the experiences. The information may further include timing data such as when a communication session or a meeting took place.

At operation 820, location and timing information is received from sources like a GPS server, a cellular network server, or similar sources. The information may also include timestamps for comparison with the timing information of the experience content received at operation 810. At operation 830, the content and the location/timing information may be integrated for each user such that a spatial and temporal record of each user's experiences is established. This is followed by operation 840, where the content information may be summarized. Content of experiences may include extensive information such as the entire body of an email exchange, a recording of a meeting, and so on. For ease of presentation to the user, the content may be summarized to a presentable format such as subject headers for emails, meetings, and the like.

At operation 850, the content information is indexed spatially and temporally such that experience records can be searched by time, location, or content (subject). Following operation 850, the experiences may be rendered searchable and replayable to the user as shown in example user interfaces of FIG. 3 through 5 at operation 860.

The operations included in process 800 are for illustration purposes. Providing search and replay of experiences capability based on geographic locations may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for enabling search and replay of experiences based on geographic locations, the method comprising:

receiving content information associated with a user's experiences via an experience replay application from a content generator;

receiving location and timing information associated with a location of a user during a time period encompassing the experiences at the experience replay application;

integrating the content information and the location and timing information;

summarizing the integrated content information prior to indexing into a presentable format by including subject headers for an email exchange and a meeting associated with the user;

including an entire body of the email exchange and a recording of the meeting in the summarized integrated content information;

indexing the summarized integrated content information spatially and temporally according to a tree-based index structure beginning at an organization level, dividing the organization spatially down to a room level, and coupling the experiences that occurred at each room level location following a temporal index;

rendering the indexed content information searchable at the experience replay application such that the user's experiences during the time period encompassing the experiences is displayed using a visual scheme; and providing printing information associated with the user's experiences by providing at least one relevant application link at the experience replay application to launch at least one relevant application associated with the user's experiences.

2. The method of claim 1, wherein integrating the content information includes tagging the content information with the corresponding location and timing information.

3. The method of claim 1, wherein the content information includes at least one from a set of: an attended event, the meeting, a conversation, the email exchange and a received communication.

4. The method of claim 3, wherein the content information is received from at least one from a set of: a communication application, a scheduling application, a calendar application, a presence application, and a database.

5. The method of claim 1, wherein the location and timing information is received from one of: a Global Positioning Service (GPS) server, a cellular network server, and a non-cellular network server.

6. The method of claim 1, wherein displaying the experiences using a visual scheme includes displaying a map of locations corresponding the user's experiences within a user defined time frame employing a graphic scheme to represent locations for groups of activities.

7. The method of claim 6, further comprising:
in response to selection of another location on the displayed map, displaying a secondary user interface presenting detailed information associated with experiences at the selected location following timeline.

8. The method of claim 7, wherein the secondary user interface presents for each experience a type of experience, a time of the experience, a subject of the experience, and a contact for the experience, and wherein at least a portion of displayed information includes actionable items.

9. The method of claim 8, wherein the actionable items include links to at least one from a set of: a document, a recording, a contact information, and a complete content information associated with selected experiences.

10. The method of claim 1, wherein the content information is received from records associated with one of: a voice communication, a video communication, a text message exchange, an application sharing session, a data sharing session, and a whiteboard sharing session.

11. An enhanced communication system for enabling search and replay of experiences based on geographic locations, the system comprising:
a server comprising a memory and a processor the processor configured to execute a communication management framework and further configured to:
enable a plurality of data sources to store a record of content information associated with a user's experiences;
receive the content information associated with the user's experiences from the plurality of data sources via an experience replay application;
receive location and timing information associated with a location of a user during a time period encompassing the experiences at the experience replay application;
tag the content information with the location and timing information;
integrate the content information based on the user and the location;
summarize the content information;
index the summarized and tagged content information spatially and temporally according to a tree-based index structure beginning at an organization level, dividing the organization spatially down to a room level, and coupling the experiences that occurred at each room level location following a temporal index; and
render the indexed content information spatially and temporally searchable at the experience replay application; and
a client device comprising another memory and another processor, the other processor configured to execute a location based search engine and further configured to:
receive a user input for at least one of: a location range and a time period;
perform a search on the indexed content information based on the user input;
present the user's experiences based on the user input employing a map-based scheme;
provide a callout balloon displaying at least one of: a time frame and a subject of a selected experience in response to a selection of one of the user's experiences displayed in the map-based scheme;
present a subject of a call associated with the user as an actionable item within the callout balloon; and
provide links to a recording of the call and a contact information of a called party through the actionable item.

12. The system of claim 11, wherein the map-based scheme includes:
displaying a map of locations provided by the user input in a primary user interface;
upon selection of another location by the user, displaying a group of experiences for the selected location in a secondary user interface using one of: a building plan and a building model.

13. The system claim 12, wherein the secondary user interface displays experiences at the room level.

14. The system of claim 12, wherein the secondary user interface displays content information for each experience employing actionable items configured to provide detailed content activating at least one other application.

15. The system of claim 11, wherein an integration and search of the content information are performed by employing at least one from a set of: a branch-and-bound algorithm, a progressive improvement algorithm, and a heuristic algorithm.

16. A computer-readable memory device having instructions stored thereon for enabling search and replay of experiences based on geographic locations, the instructions comprising:
receiving content information via an experience replay application from a content generator including at least one of: an application and a database providing the content information associated with a user's experiences including at least one from a set of: an attended event, a meeting, a conversation, an email exchange and a received communication from at least one from a set of: a communication application, a scheduling application, a calendar application, a presence application, and a database;
receiving location and timing information associated with a location a user during a time period encompassing the experiences at the experience replay application;
tagging the content information with the location and timing information;
integrating the content information based on the user and the location;
summarizing the content information into a presentable format by including subject headers for an email exchange and a meeting associated with the user;
including an entire body of the email exchange and a recording of the meeting in the summarized and tagged content information;
indexing the summarized and tagged content information spatially and temporally according to a tree-based index structure beginning at an organization level, dividing the organization spatially down to a room level, and coupling the experiences that occurred at each room level location following a temporal index at the experience replay application;
receiving a user input for at least one of: a location range and a time period;
performing a search on the indexed content information based on the user input at the experience replay application;
presenting the user's experiences based on the user input employing a map-based user interface;
providing a callout balloon displaying at least one of: a time frame and a subject of a selected experience in response to a selection of one of the user's experiences displayed in the map-based user interface;

presenting a subject of a call associated with the user as an actionable item within the callout balloon;

providing links to a recording of the call and a contact information of a called party through the actionable item; and providing printing information associated with the user's experiences by providing at least one relevant application link at the map-based user interface to launch at least one relevant application associated with the user's experiences.

17. The computer-readable memory device of claim 16, wherein tagging the content information with the location and timing information includes comparing location and timing information with timing information included in the content information.

18. The computer-readable memory device of claim 16, wherein the experiences are displayed with actionable items employing at least one from a set of: a graphical shape based scheme, an icon scheme, and a text formatting scheme.

* * * * *